United States Patent
Smith et al.

(10) Patent No.: US 7,671,306 B1
(45) Date of Patent: **\*Mar. 2, 2010**

(54) LASER ABLATIVE SYNTHESIS OF CARBON NANOTUBES

(75) Inventors: Michael W. Smith, Newport News, VA (US); Kevin Jordan, Newport News, VA (US); Cheol Park, Yorktown, VA (US)

(73) Assignee: Jefferson Science Associates, LLC, Newport News, VA (US)

( * ) Notice: Subject to any disclaimer, the term of this patent is extended or adjusted under 35 U.S.C. 154(b) by 500 days.

This patent is subject to a terminal disclaimer.

(21) Appl. No.: 11/589,011

(22) Filed: Oct. 27, 2006

(51) Int. Cl.
*H05B 6/02* (2006.01)
*B23K 26/02* (2006.01)
*B23K 26/08* (2006.01)
*D01F 9/12* (2006.01)

(52) U.S. Cl. ............... 219/601; 219/121.6; 219/121.85; 423/447.1; 977/844

(58) Field of Classification Search ............ 219/121.64, 219/121.86, 121.6, 121.68, 121.78, 121.79, 219/121.8, 121.82, 121.84, 121.85, 601, 219/770; 423/447.1, 445 R, 448; 977/844, 977/889; 502/100, 174, 180
See application file for complete search history.

(56) References Cited

OTHER PUBLICATIONS

Eklund et al., "Large-Scale Production of Single-Walled Carbon Nanotubes Using Ultrafast Pulses from a Free Electron Laser," 2002, Nano Letters, 2 (6), pp. 561-566.*

* cited by examiner

*Primary Examiner*—Wayne Langel
*Assistant Examiner*—Brittany M Martinez

(57) ABSTRACT

An improved method for the production of single walled carbon nanotubes that utilizes an RF-induction heated side-pumped synthesis chamber for the production of such. Such a method, while capable of producing large volumes of carbon nanotubes, concurrently permits the use of a simplified apparatus that allows for greatly reduced heat up and cool down times and flexible flowpaths that can be readily modified for production efficiency optimization. The method of the present invention utilizes a free electron laser operating at high average and peak fluence to illuminate a rotating and translating graphite/catalyst target to obtain high yields of SWNTs without the use of a vacuum chamber.

16 Claims, 3 Drawing Sheets

LASER ABLATIVE SYNTHESIS OF CARBON NANOTUBES

The United States of America may have certain rights to this invention under Management and Operating Contract DE-AC05-84ER 40150 from the United States Department of Energy.

FIELD OF THE INVENTION

The present invention relates to the synthesis of single-walled carbon nanotubes and more particularly to a novel method for such synthesis using a free electron laser.

BACKGROUND OF THE INVENTION

Since the first reports of the production of single-walled carbon nanotubes (hereinafter SWNT) in 1991 by researchers at NEC and IBM, a variety of synthesis routes have been developed to improve both the production rate and the fractional conversion of carbon feedstocks to SWNTs. Among the methods developed for this purpose, all of which are well known and well documented in the art are: Arc Discharge (AD); Pulsed Laser Vaporization (PLV); and Chemical Vapor Deposition (CVD). Much of the work with PLV techniques has been carried out at Rice University as reported by A. Thess et al. in Science 273, 483 (1996). While this work still represents, to the best of our knowledge, the state of the art in the production of high quality SWNTs, it must be noted that the production rates for the processes described by these researchers are only on the order of milligrams per hour. The results of this work and the application of the SWNTs thus produced indicate that there exist many applications for SWNTs, but only if adequately high production rates can be achieved while maintaining the quality of the SWNT, i.e. the integrity of the tube wall.

One such application is as reinforcement for lightweight polymeric structures, especially inflatable structures for use in outer space where in addition to the strength imparting properties of the SWNTs, their electrical conductivity provides a means of reducing static charge buildup on such devices. Other potential applications reside in the areas of hydrogen storage at "low", i.e. about atmospheric pressure, although debate still rages as to this application and in NEMS or nano electro-mechanical structures useful in, for example, quantum computing devices.

It has been demonstrated that the longer the SWNT the better its properties as a reinforcing agent. Similarly, it is highly desirable that the SWNT "bundles" be small to permit better dispersal in the foregoing reinforcement applications. According to evaluations of SWNTs produced in accordance with the work at Rice University their SWNTs are on the order of 3-5 μm in length and occur in bundles about 10-25 nm in length. Evaluation of SWNTs produced in accordance with the present invention are generally 4-10 μm in length and occur in bundles of from 4-18 nm in length, thus making them more desirable candidates for application in reinforcing applications.

Thus, while there exist numerous areas of potential and actual application for SWNTs, what has been, and is currently lacking, is a method for the production of SWNTs of high quality in sufficient quantities as to provide a reliable and adequate source of desirable raw material for the development and implementation of such applications.

While numerous attempts have been made to improve the production rates of these materials, most such attempts have resulted in the design of carbon nanotube production apparatus and operating procedures that were extremely complex due to operating conditions below atmospheric pressure, required extended heat up and cool down times on the order of hours and/or provided limited flowpaths that could not be readily modified for optimal apparatus operation.

There therefore remains a significant need for an apparatus and operating method that while capable of producing large volumes of carbon nanotubes provide simplified apparatus, greatly reduced heat up and cool down times and flexible flowpaths that can be readily modified for production efficiency optimization.

OBJECTS OF THE INVENTION

It is therefore an object of the present invention to provide a method for the production of carbon nanotubes that, while capable of producing large volumes of carbon nanotubes, concurrently utilizes a simplified apparatus that allows for greatly reduced heat up and cool down times and flexible flowpaths that can be readily modified for production efficiency optimization.

SUMMARY OF THE INVENTION

According to the present invention, there is provided an improved method for the production of single walled carbon nanotubes that utilizes an RF-induction heated side-pumped synthesis chamber for the production of such. Such a method, while capable of producing large volumes of carbon nanotubes, concurrently permits the use of a simplified apparatus that allows for greatly reduced heat up and cool down times and flexible flowpaths that can be readily modified for production efficiency optimization. The method of the present invention utilizes a free electron laser operating at high average and peak fluence to illuminate a rotating and translating graphite/catalyst target to obtain high yields of SWNTs without the use of a vacuum chamber.

DETAILED DESCRIPTION

Figure 1:
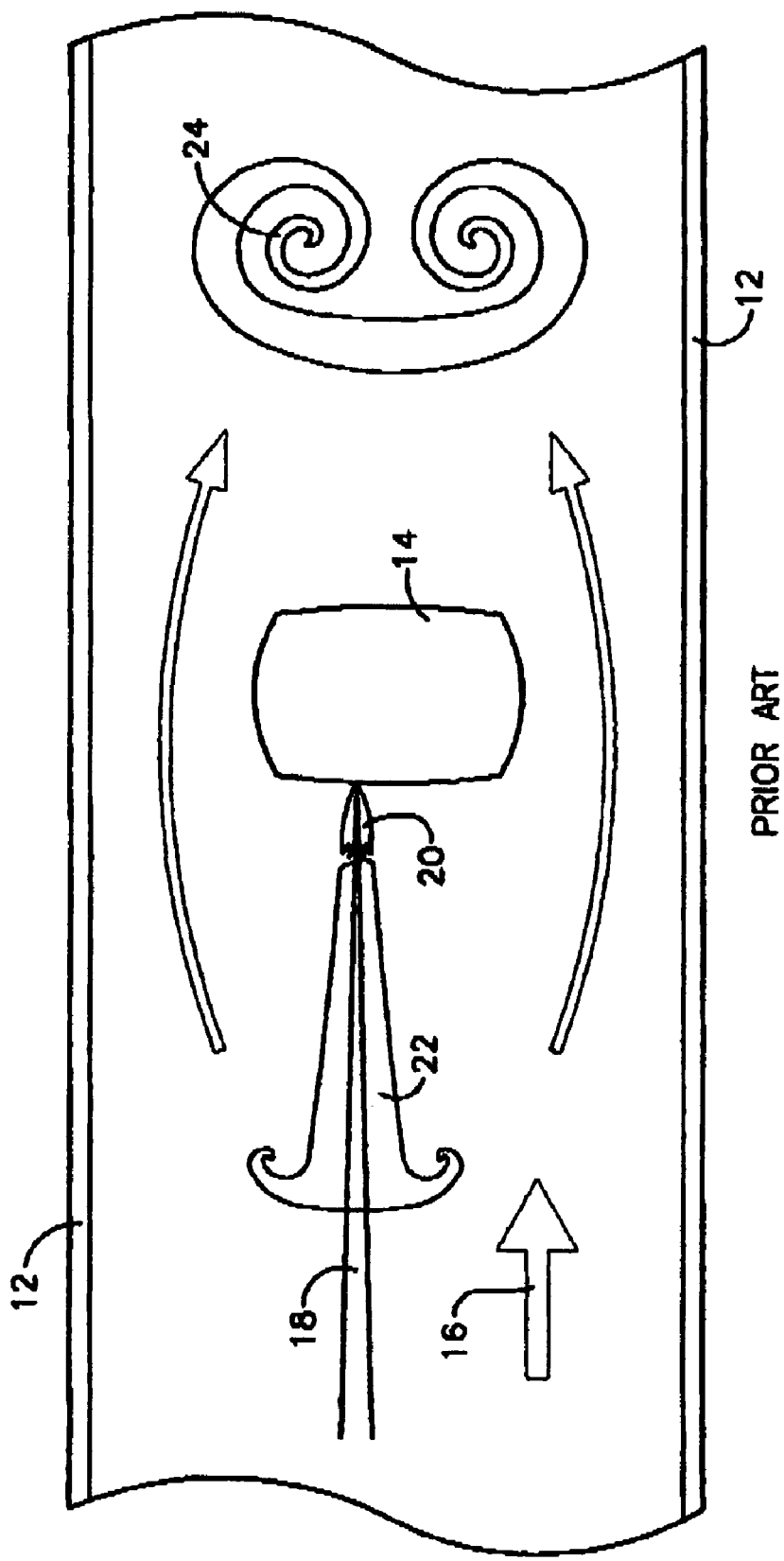
FIG. 1 is a schematic depiction of a front-pumped carbon nanotube production chamber of the type used in the methods of the prior art.

Referring now to the accompanying drawings, as shown in FIG. 1, the original front-pumped chamber 10 utilized to produce carbon nanotubes included a vacuum chamber 12 maintained at about 500 torr and 1000° C., a graphite/catalyst target 14, an argon flow as depicted by arrow 16 and a laser beam 18 that interacted in well-known fashion to produce a plasma plume 20 that in turn resulted in the formation of a nanotube vortex 22 that, driven by argon flow 16, resulted in movement of vortex 22 toward and onto a target at 24.

While such an apparatus was capable of producing carbon nanotubes, its production levels were very low and demanded improvement.

Figure 2:
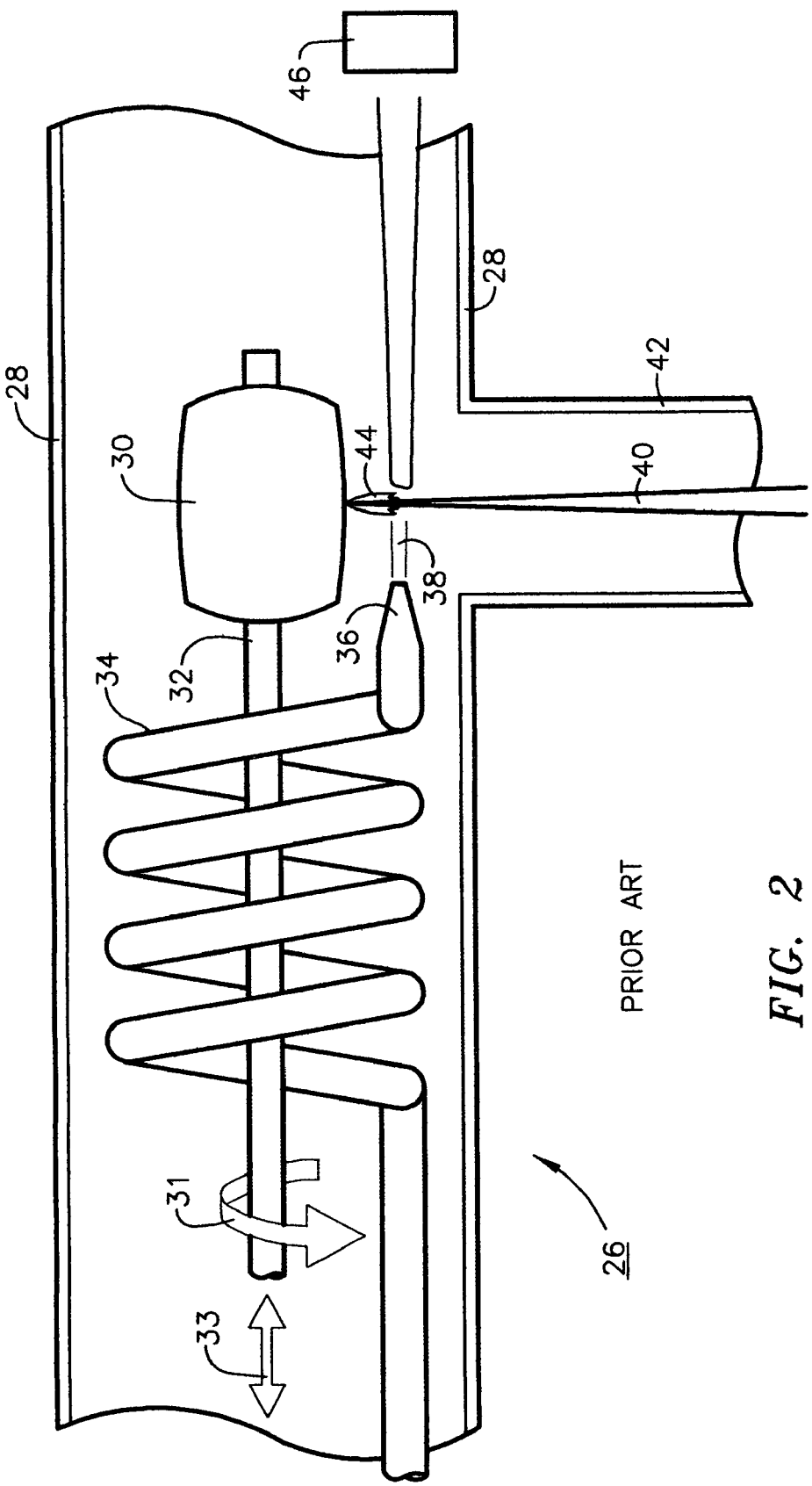
FIG. 2 is a schematic depiction of a side-pumped carbon nanotube production chamber of the type used in the methods of the prior art.

FIG. 2 depicts one of the first side-pumped synthesis chambers for the production of carbon nanotubes designed to improve the level of production of carbon nanotubes over the levels achievable with the design of FIG. 1.

As shown in FIG. 2 the prior art side-pumped synthesis chamber 26 comprised a chamber furnace 28 maintained at about 1000° C. and 760 torr; a rotatable graphite/catalyst target 30 mounted on a rotating and horizontally moveable spindle 32 as depicted in FIG. 2 by arrows 31 and 33 respectively; an argon heater 34 terminating in a sonic nozzle 36 that generated a heated argon flow 38; a laser beam 40 impacting target 30 through a side chamber 42 to generate a plasma plume 44 that was driven by heated argon flow 38 to form a nanotube spray that was subsequently deposited on a target 46. While this apparatus performed quite satisfactorily and resulted in the production of carbon nanotubes in volumes of 2-6 grams per hour as opposed to the 200 milligram per hour production rates of prior art devices, it possessed certain inherent limitations.

Because of its design and operating conditions, heat up of the device to 1000° C. required about 2 hours and cool down occurred over a 3-4 hour period, maintenance of the 760 torr vacuum greatly complicated plumbing and flow controls and flowpath variability was quite restricted. Thus, while carbon nanotube production was significant operating conditions remained somewhat constrained. To eliminate these operating constraints, the apparatus depicted in FIG. 3 was designed, constructed and operated.

Figure 3:
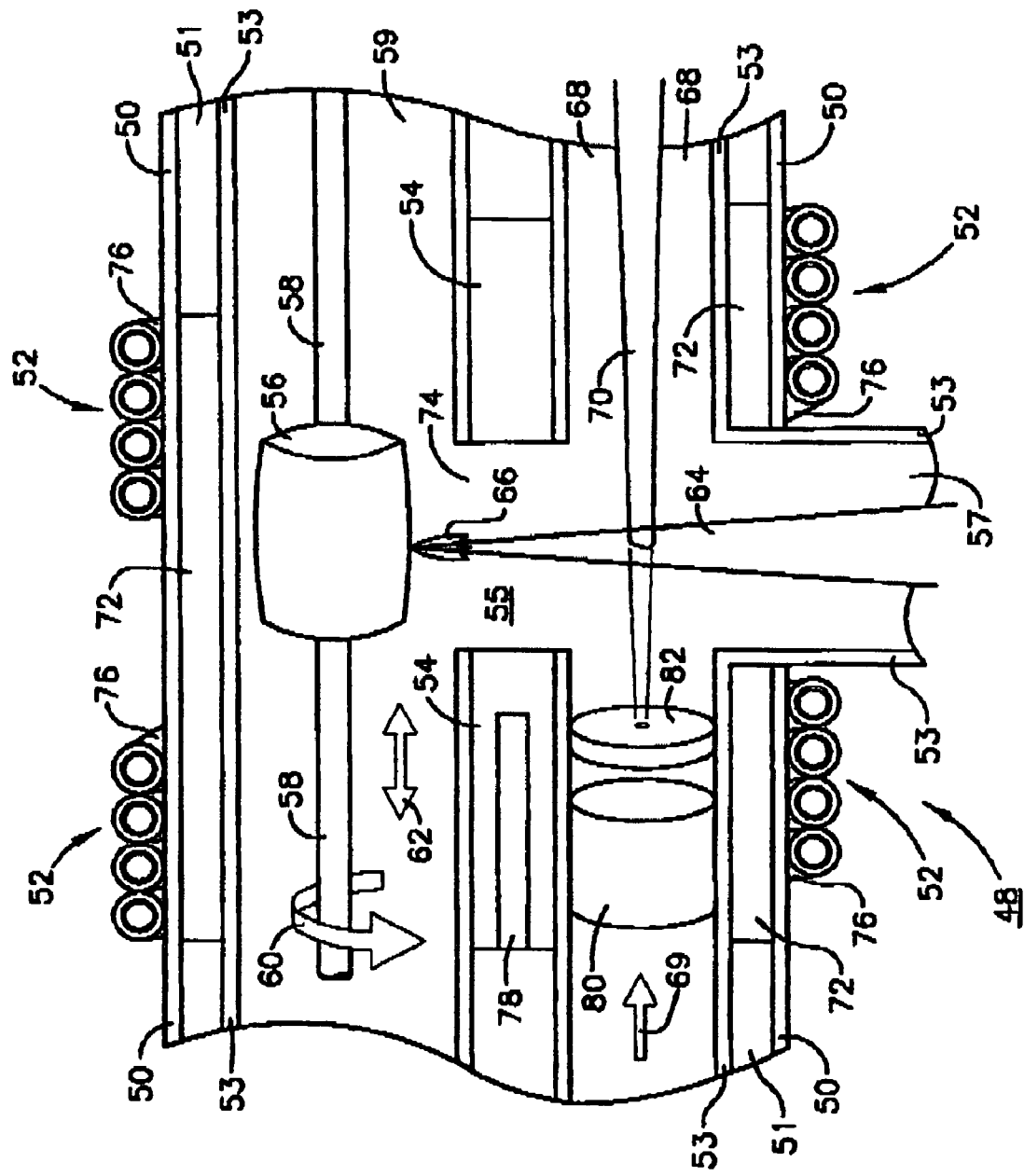
FIG. 3 is a schematic depiction of the RF-induction heated side-pumped carbon nanotube synthesis chamber utilized in the practice of the present invention.

Referring now to FIG. 3 that depicts schematically the preferred RF-induction heated side-pumped chamber 48 utilized in the method of the present invention, this apparatus comprises: a quartz purge vessel 50 surrounded by an RF heating coil 52 (preferably a 3.5 KW RF coil); a conventional generally T-shaped tube-type furnace 53 defining a horizontal chamber 55 and a vertical chamber 57 containing the various subsequently described elements of chamber 48; an induction heated graphite core 54 bisecting horizontal chamber 55 into target chamber 59 and flowpath 68 and defining a gap 74 also referred to herein as ablation zone 74; a graphite/catalyst target 56 that is mounted on a spindle 58 that rotates in the direction shown by arrow 60 and translates in the directions shown by arrow 62; a side-pumped laser beam 64 that enters chamber 48 through vertical chamber 57, passes through gap 74 and strikes target 56 forming an ablation plume 66 and a flowpath 68 for the nanotube spray 70 to exit synthesis chamber 48 and be collected on a separate deposition target (not shown). As is well known in the art, the separate deposition target comprises a separate chamber containing water-cooled copper baffle plates on which the SWNT soot collects by thermophoresis as in any conventional SWNT deposition system. Spindle 58 is rotated and translated by means of a servo motors (not shown) in a conventional fashion. A graphite felt insulation layer 72 is preferably used to maintain temperature in the area of target 56 within synthesis chamber 48 and woven silica insulation 76 is also preferably used to retain heat in the entire assembly. According to a preferred embodiment, synthesis chamber 48 also includes a pyrometer port 78 in graphite core 54 for purposes of monitoring the temperature of graphite core 54 and the temperature within inner chamber 48. A purge gas is also applied within area 51 to further insulate and maintain proper operating conditions within chamber 48.

Within flowpath 68, argon temperature and flow, as shown by arrow 69, are controlled by the presence of a porous plug graphite heater 80 and a orifice plate 82, preferably fabricated from Niobium, the former imparting heat to flowpath 68 and the latter, regulating the flow of argon in flowpath 68 and hence the size, shape and velocity of nanotube spray 70.

The apparatus just described can be brought to operating temperature in about 8 minutes and requires only about 15 minutes to cool down to room temperature thus significantly shortening operating cycle time.

The apparatus just described is useful in the practice of a novel method for the production of SWNTs. Spinning target 56 and illuminating it with laser beam 64 can produce a variety of results depending primarily upon three variables. These three variables are: the temperature of ablation zone 74; the spin rate and pattern of movement of target 56; and laser fluence 64 in W/cm$^2$ which is inversely proportional to the focal spot size of laser beam 64. Target grain size can also affect production rates and a fine grain target 56 relative to the size of the laser spot produces larger yields.

Regarding each of the variables just mentioned for optimum production the temperature of ablation zone 74 should be at or above 1000° C. At temperatures below 750° C. nanotube yield is trivially low. Thus, while the process can be performed at temperatures above about 800° C., it is preferred that the ablation temperature be above 1000° C. As to the spin rate of target 56 results indicate that a high spin rate is favorable so that a shallow depth of target material is removed on each track of laser beam 64. In those cases where the grain size of the target relative to the depth of material removed with each pass was large, high spin rates produce unfavorable results. Thus, the finest grain possible should be used to obtain the best results. It has also been found that spin pattern can play an important role in the nanotube production process. Best results were obtained when a "barber pole" stripe of material was removed from target 56 with each pass through the rotational and translational action of spindle 58. By tracking each subsequent strip carefully next to the previous stripe a continuous layer of material is removed, while the barber pole pattern allows distribution of waste heat from the plasma over the full length of the target thereby minimizing localized heating that produces undesirable results.

The fluence of the laser beam 64 also plays an important role in the successful practice of the method of the present invention. According to a preferred embodiment of the present invention, laser beam 64 is produced by a free electron laser. In conventional laser ablation processes used for the production of carbon nanotubes a Nd:YAG laser is generally used. Representative conditions for such a laser are :3 W average power at 30 Hz repetition rate with ~1 J/pulse. Thus, for a 10 nanosecond pulse and 1 cm diameter spot the average fluence is 4 W/cm$^2$ and the peak fluence is $1.3 \times 10^{e8}$ W/cm$^2$. Using the preferred free electron laser of the present method, a 700 W beam at 9 MHz repetition rate with a 0.5 picosecond pulse focused to a 0.15 cm spot yields an average fluence of $9 \times 10^{e6}$ W/cm$^2$ and a peak fluence of $2.2 \times 10^{e11}$ W/cm$^2$ thus the fluence is about one million times greater due to the physics associated with the interaction of ultrafast pulses with a solid surface.

While fluence plays an important role, it has also been found that best yields are obtained using the lowest possible fluence (largest spot size) that will sustain a plume. In practice, this involves focusing laser beam 64 tightly to initiate a plume and then defocusing to the point just before extinction of the plume or just above the ablation threshold. This procedure allows the use of a larger spot size than can be achieved in equilibrium. It is theorized that the larger spot size produces higher yields as it reduces thermal coupling to the target in favor of ultrafast non-thermal coupling, which in turn, produces greater excitation and finer diminution of nanotube precursors. Thus, fluence can vary greatly within the successful practice of the present invention depending upon, for example, the grain size of the target etc.

There has thus been described a novel method for the high yield production of carbon nanotubes comprising exposing a rotating and translating graphite/catalyst target to the beam of a laser produced by a free electron laser in the absence of a vacuum.

As the invention has been described, it will be apparent to those skilled in the art that the same may be varied in many ways without departing from the spirit and scope of the invention. Any and all such modifications are intended to be included within the scope of the appended claims.

What is claimed is:

1. A method for the production of carbon nanotubes comprising ablating a rotating and translating graphite-catalyst target at elevated temperature with a laser beam produced by a free electron laser producing a 700 W beam at a 9 MHz repetition rate with a 0.5 picosecond pulse focused to a 0.15 cm spot yielding an average fluence of $9 \times 10^{e6}$ W/cm$^2$ and a peak fluence of $2.2 \times 10^{e11}$ W/cm$^2$ in the absence of a vacuum.

2. The method of claim 1 wherein said target is maintained at a temperature above 800° C.

3. The method of claim 2 wherein said target is maintained above 1000° C.

4. The method of claim 1 wherein said target is rotated and translated in such a fashion as to define a barber pole pattern of illumination by said laser beam.

5. The method of claim 3 wherein said target is rotated and translated in such a fashion as to define a barber pole pattern of illumination by said laser beam.

6. The method of claim 1 wherein said target is rotated at a rate such that the depth of material removed by laser beam ablation is matched to the grain size of the target.

7. The method of claim 6 wherein said target is rotated and translated in such a fashion as to define a barber pole pattern of illumination by said laser beam.

8. The method of claim 1 wherein the lowest possible free electron laser fluence is used as determined by focusing the laser beam tightly to initiate ablation then defocusing to a point just before plume extinction or just above the ablation threshold and operating at this fluence.

9. The method of claim 1 wherein said carbon nanotube production is performed in an RF-induction heated side-pumped synthesis chamber comprising:

a. a generally T-shaped furnace housing defining a horizontal chamber and a vertical chamber for the admission of a laser beam;
b. an RF coil about at least a portion of said horizontal chamber;
c. a graphite core bisecting said horizontal chamber to form parallel target and flowpath chambers and having a gap therein, said gap being aligned with said vertical chamber and defining an ablation zone;
d. a spindle capable of rotational and translational movement within said target chamber;
e. graphite-catalyst target mounted on said spindle and moving therewith in alignment with said gap;
f. said flowpath chamber defining a path for the passage of a nanotube spray from said synthesis chamber;
g. a porous plug heater in said flowpath up stream of said vertical chamber for heating incoming inert gas; and
h. an orifice plate intermediate said porous plug heater and said vertical chamber controlling the flow of inert gas to said flowpath.

10. The method of claim 9 wherein said target is maintained at a temperature above 800° C.

11. The method of claim 10 wherein said target is maintained above 1000° C.

12. The method of claim 9 wherein said target is rotated and translated in such a fashion as to define a barber pole pattern of illumination by said laser beam.

13. The method of claim 11 wherein said target is rotated and translated in such a fashion as to define a barber pole pattern of illumination by said laser beam.

14. The method of claim 9 wherein said target is rotated at a rate such that the depth of material removed by laser beam ablation is matched to the grain size of the target.

15. The method of claim 14 wherein said target is rotated and translated in such a fashion as to define a barber pole pattern of illumination by said laser beam.

16. The method of claim 9 wherein the lowest possible free electron laser fluence is used as determined by focusing the laser beam tightly to initiate ablation then defocusing to a point just before plume extinction or just above the ablation threshold and operating at this fluence.

* * * * *